US012658194B2

(12) United States Patent
Chivukula et al.

(10) Patent No.: US 12,658,194 B2
(45) Date of Patent: Jun. 16, 2026

(54) TRANSCODING AUDIO FRAMES AND CONVERTING METADATA FRAMES BASED ON A TARGET ENCODER

(71) Applicant: Apple Inc., Cupertino, CA (US)

(72) Inventors: Ravi Kiran Chivukula, San Jose, CA (US); Dipanjan Sen, Dublin, CA (US); Tejaswi Nanjundaswamy, San Jose, CA (US)

(73) Assignee: Apple Inc., Cupertino, CA (US)

( * ) Notice: Subject to any disclaimer, the term of this patent is extended or adjusted under 35 U.S.C. 154(b) by 261 days.

(21) Appl. No.: 18/466,663

(22) Filed: Sep. 13, 2023

(65) Prior Publication Data

US 2025/0087225 A1 Mar. 13, 2025

(51) Int. Cl.
*G10L 19/16* (2013.01)

(52) U.S. Cl.
CPC .................................. *G10L 19/173* (2013.01)

(58) Field of Classification Search
None
See application file for complete search history.

(56) References Cited

U.S. PATENT DOCUMENTS 7,836,105 B2 11/2010 Marriott et al.
7,996,427 B1 8/2011 Flick et al.
10,904,689 B2 * 1/2021 Yoo ........................ G10L 19/173
2006/0020474 A1 1/2006 Stewart et al.
2006/0242325 A1 * 10/2006 Ramaswamy ........ H04L 65/765 709/246
2009/0083047 A1 * 3/2009 Lindahl .................. G11B 27/28 704/504
2009/0125315 A1 * 5/2009 Koishida ............... G10L 19/173 704/503
2014/0358554 A1 12/2014 Riedmiller et al.
2015/0372820 A1 * 12/2015 Schneider ............. H04L 65/765 380/42
2017/0086008 A1 3/2017 Robinson
2018/0316926 A1 * 11/2018 Freund ........... H04N 21/234309
2020/0081682 A1 3/2020 Vestal
2020/0162772 A1 5/2020 Kandov et al.
2020/0275171 A1 * 8/2020 Cloud ...................... H04L 65/75
2022/0150514 A1 * 5/2022 Miller ................ H04N 21/8456
2025/0087222 A1 * 3/2025 Chivukula ............ G10L 19/173

* cited by examiner

*Primary Examiner* — Douglas Godbold
(74) *Attorney, Agent, or Firm* — Aikin & Gallant, LLP

(57) ABSTRACT

A target encoder may receive, from a source decoder, a source bitstream including an audio frame and a metadata frame associated with the audio frame. The target encoder may transcode the audio frame to a new audio frame in a target format associated with the target encoder. The target encoder may convert the metadata frame into a new metadata frame associated with the new audio frame. The target encoder may then generate a target bitstream including the new audio frame and the new metadata frame. Other aspects are also described and claimed.

22 Claims, 6 Drawing Sheets

| |
|---|
| if (transcodeConfigPresent) { |
| lengthInBytes |
| metadataVersion |
| codecIdentifier |
| startIdxPresentInFrames |
| fillBits |
| configData |
| } |

FIG. 3

```
if (transcodeConfigPresent) {
    if(transcodeMetadataPresent) {
        byteSize
        if (startIdxPresentInFrames) {
            metaDataStartIndex;
        }
        fillBits
        metaData
    }
}
```

FIG. 4

```
if (trimmingDataPresent) {
    numSamplesTrimmedFromStart
    numSamplesTrimmedFromEnd
}
```

FIG. 5

TRANSCODING AUDIO FRAMES AND CONVERTING METADATA FRAMES BASED ON A TARGET ENCODER

This disclosure relates generally to transmission of audio data and, more specifically, to transcoding audio frames and converting metadata frames based on a target encoder. Other aspects are also described.

BACKGROUND

An audio codec (coder/decoder) is a device or computer program that can encode and/or decode audio data in a bitstream. An audio codec (or simply codec) can be used in a system to efficiently transmit compressed audio data. For example, a device streaming media content could utilize a codec (e.g., an encoder) to generate a bitstream from the media content. The bitstream could then be sent efficiently to another codec (e.g., a decoder) downstream. For example, the encoder could be implemented by a mobile phone, and the decoder could be implemented by a head unit in a vehicle. The decoder could then decode the bitstream from the encoder and send media content from the decoded bitstream to a sound environment (e.g., one or more speakers in the vehicle).

SUMMARY

Implementations of this disclosure include utilizing a target encoder and/or a target decoder to support multiple different audio formats including metadata while reducing the number of possible codecs in the system. The target encoder may be configured based on a type of source decoder that may be upstream in the system. The target decoder may be configured based on the target encoder and/or a type of audio renderer that may be downstream in the system. The target encoder may enable transcoding audio data from different upstream compressed audio formats (e.g., different source formats from different source encoders) to audio frames in a common target format, and transporting metadata from the different source formats with the transcoded audio frames in a downstream compressed audio bitstream (e.g., a target bitstream). For example, the target encoder could be implemented by a first device streaming media content, such as a mobile device (e.g., a mobile phone, tablet, laptop, or another mobile computer). The target decoder may enable decoding audio data from the transcoded audio frames in the target bitstream and transporting the metadata from the target bitstream with the audio data to different downstream renderers. For example, the target decoder could be configured on a second device for playing media content in a 3D sound environment, such as a head unit in a vehicle connected to a plurality of speakers. Other aspects are also described and claimed.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

FIG. 3 is an example of initializing a target decoder and/or a renderer.

FIG. 4 is an example of a format of metadata in new frames from a target encoder to a target decoder.

FIG. 5 is an example of configuring a target encoder for gapless playback.

DETAILED DESCRIPTION

Figure 1:
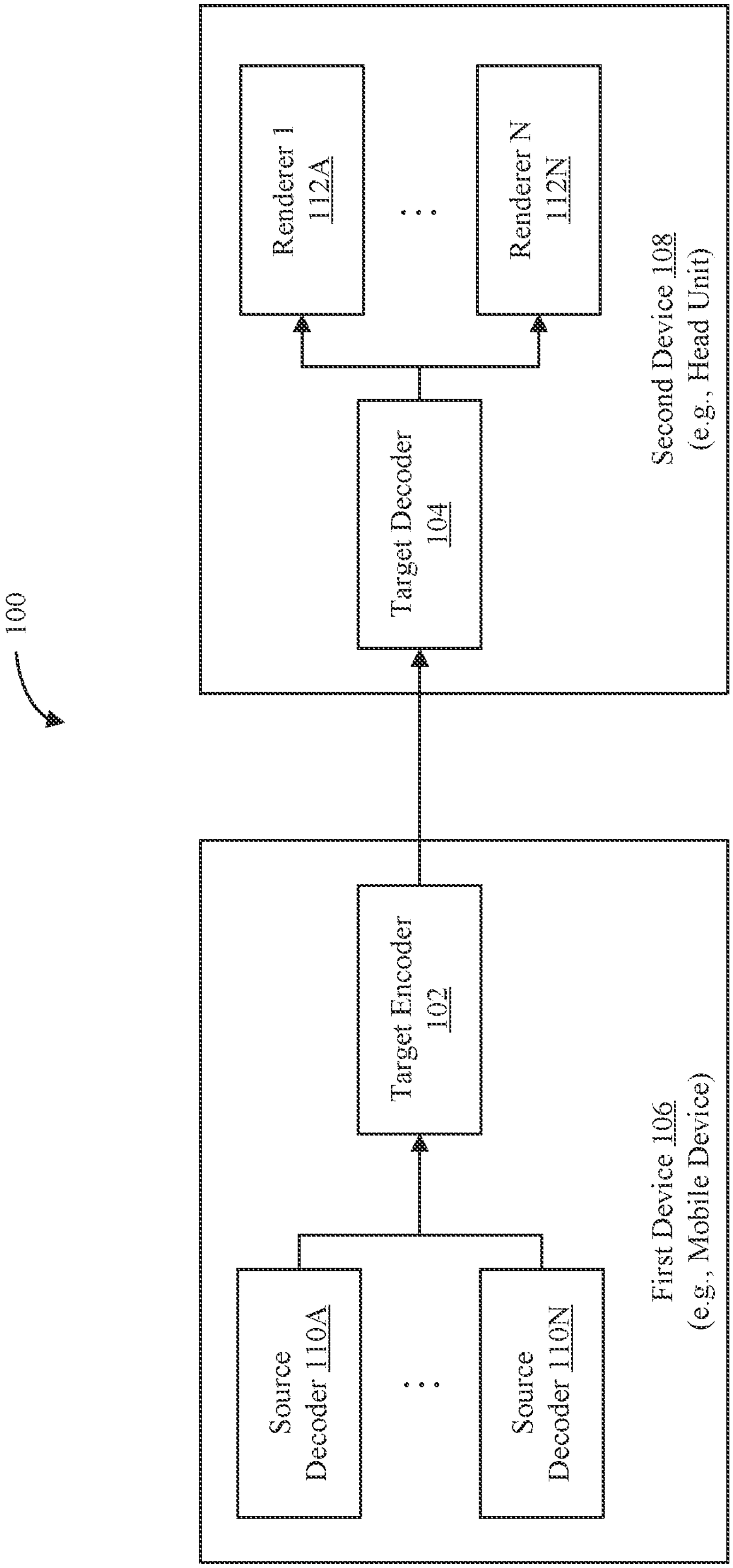
FIG. 1 is an example of a system for communicating audio frames and metadata frames utilizing a target encoder and a target decoder.

Many different formats exist today for communicating audio data. As a result, many different audio codecs also exist. The codecs may differ, for example, in the way that they encode audio data in a bitstream (e.g., the encoded frames may have differing sizes, durations, and/or protocols). While supporting the different formats that exist may be desirable to achieve compatibility with other systems, doing so can be difficult and burdensome. For example, implementing devices that support different formats may require significant engineering effort to develop, port, and support each of the codecs on different devices that communicate with one another. Additionally, supporting the different formats may also require paying licensing fees for instances of different codecs on various devices.

Further complicating this, modern compressed audio formats may feature complex sound content, such as audio data that can move in three dimensional (3D) space over time. Describing constantly varying positions and other time varying aspects of objects in a sound environment may require the compressed formats to carry metadata in the bitstream. Metadata generally refers to data that provides information about other data. In a 3D sound environment, metadata may provide information about audio data, such as specifying a particular speaker for playing a sound that is represented by the audio data. The different formats for communicating audio data may define and use metadata in different ways. While transcoding audio data from one format to another is possible, metadata is typically not amenable to transcoding due to its inflexible nature. What is needed is a system that can support different audio formats including metadata while reducing the number of possible codecs in a system.

Implementations of this disclosure address problems such as these by utilizing a target encoder and/or a target decoder to support multiple different audio formats including metadata while reducing the number of possible codecs in the system. The target encoder may be configured based on a type of source encoder/decoder that may be upstream in the system. The target decoder may be configured based on the target encoder and/or a type of audio renderer that may be downstream in the system. The target encoder may enable transcoding audio data from different upstream compressed audio formats (e.g., different source formats from different source encoders) to audio frames in a common target format, and transporting metadata from the different source formats with the transcoded audio frames in a downstream compressed audio bitstream (e.g., a target bitstream). For example, the target encoder could be implemented by a first device streaming media content, such as a mobile device. The target decoder may enable decoding audio data from the transcoded audio frames in the target bitstream and transporting the metadata from the target bitstream with the audio data to different downstream renderers. For example, the target decoder could be configured on a second device for playing media content in a 3D sound environment, such as a head unit in a vehicle connected to a plurality of speakers. As a result, the target encoder and/or the target decoder may enable different audio formats that include metadata to be supported in a system while reducing the number of possible codecs in the system.

In some implementations, the target encoder may receive a source bitstream, from a source decoder, including an audio frame and a metadata frame associated with the audio frame. The source bitstream could be from a source decoder which could be a first type of codec among multiple types of codecs in the system. The audio frame may contain audio data generated by decoding data in the source format, and the metadata frame may include metadata describing the audio data according to the source format (e.g., an uncompressed audio frame and a corresponding metadata frame). The target encoder may transcode the audio frame to a new audio frame in a target format associated with the target encoder. For example, the transcoding may include decoding audio data in the source format, then re-encoding the audio data in the target format. The target encoder may convert the metadata frame into a new metadata frame associated with the new audio frame. For example, the target encoder may transport or carry the metadata from the metadata frame to one or more new metadata frames. The target encoder may then generate a target bitstream including the new audio frame and the new metadata frame. The target decoder may receive the target bitstream including the new audio frame in the target format associated with the target encoder and the new metadata frame associated with the new audio frame. The target decoder may decode audio data from the new audio frame and metadata from the new metadata frame. The target decoder may then transmit, to a selected renderer, the audio data decoded from the new audio frame and the metadata from the new metadata frame.

In some implementations, the target encoder and/or the target decoder may enable transmitting binary metadata bitstreams from different types of codecs. For example, the different codecs may define and/or use the metadata in different ways, such as describing a time varying position of audio data in a 3D sound environment, room geometry, ambisonics, channel placements, speaker lists, and/or speaker positions. The target encoder can transmit the metadata from any of these codecs in the target bitstream.

In some implementations, the target encoder and/or the target decoder may enable transmitting metadata frames from codecs with sizes and/or durations that are different from sizes and/or durations of frames utilized by the target encoder and/or the target decoder. For example, each frame could correspond to a unit of audio data. A frame from an upstream codec could have a first size (e.g., M samples, where M is a first integer, such as 256, 512, 1024, or 1536 samples, where each of the M samples is composed of X bits, such as 8, 16, or 32 bits) and/or first duration (e.g., 20 ms), and a frame from the target encoder could have a second size (e.g., N samples, where N is a second integer, such as 256, 512, 1024, or 1536 samples, where each of the N samples is composed of Y bits, such as 8, 16, or 32 bits) or second duration (e.g., 10 ms). For example, the first size could be 1536 samples, and the second size could be 1024 samples. The target encoder may transport the metadata from the codecs to the target decoder (and to the renderer for rendering in a 3D sound environment) regardless of differences between size and/or duration. In other words, sizes and/or durations of frames of source decoders need not match the target encoder.

In some implementations, the target encoder and/or the target decoder may enable the bitstream to carry additional guidance information to describe metadata frame boundaries. For example, the metadata frame boundaries may enable receivers (e.g., the target decoder) to recover from frame losses or to start decoding from a random point in the target bitstream. The target encoder may include the additional guidance information in the target bitstream to enable the target decoder to determine from the metadata frame boundaries at what audio point and onward the metadata applies. For example, if a frame is lost, the target decoder can start decoding at an arbitrary point in time and determine a boundary at which the metadata applies.

In some implementations, the target encoder and/or the target decoder may enable transmitting metadata frames that are generated in spurts or bursts in addition to metadata frames that are continuously generated. For example, some codecs that are upstream, e.g., whose outputs are to be transcoded, might not generate metadata frames continuously, but rather in spurts or bursts (e.g., the metadata could be ad hoc, or sporadic). The target encoder can convert metadata frames to the new metadata frames, whether the metadata is generated continuously or in spurts or bursts, when generating the target bitstream, and the target decoder can decode the target bitstream, including with the new metadata frames in spurts or bursts.

In some implementations, the target encoder and/or the target decoder may enable carrying the metadata without any modifications or changes to the metadata. For example, metadata in metadata frames generated by a codec that is upstream can be transported by the target encoder in its entirety, and without modification of the metadata, in new metadata frames to the target decoder. This may enable the artistic intent associated with the audio data (e.g., as described by the metadata) to remain intact for playback. In some implementations, the target encoder may change the metadata to a different format which may be transmitted to the target decoder.

Several aspects of the disclosure with reference to the appended drawings are now explained. Whenever the shapes, relative positions and other aspects of the parts described are not explicitly defined, the scope of the invention is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description.

FIG. 1 is an example of a system 100 for communicating audio frames and metadata frames utilizing a target encoder 102 and a target decoder 104. In some implementations, the target encoder 102 and the target decoder 104 may be implemented by separate devices. For example, the target encoder 102 could be implemented by a first device 106, such as a mobile device (e.g., a mobile phone, tablet, laptop, or other computer) that stores and/or streams media content. The target decoder 104 could be implemented by a second device 108, such as a head unit in a vehicle, connected to a plurality of speakers, configured to interface with the mobile device. In some implementations, the target encoder 102 and the target decoder 104 may be implemented by a same device. For example, the target encoder 102 and the target decoder 104 could be implemented together by a mobile device (e.g., the mobile phone, laptop, tablet, or other computer).

The target encoder 102 may be configured based on the type of source decoder (e.g., upstream decoder) in the system 100 for which the target encoder 102 is to transcode audio data. For example, in some implementations, multiple source decoders 110A to 110N may be present in the system 100, upstream relative to the target encoder 102 (e.g., implemented by the first device 106), where N is an integer greater than 1. Each of the source decoders 110A to 110N may represent a codec that utilizes a different format (e.g., associated with a source encoder that is upstream) for communicating audio data and metadata. For example, each of the source decoders 110A to 110N may generate audio frames based on encodings in different source formats and/or may also generate metadata for use with the audio. For example, source decoder 110A may generate audio frames that are M samples in size, and may generate metadata in metadata frames (e.g., to define positions of the audio data in a 3D sound environment) corresponding to the audio frames, based on a decoding of data from a further upstream source encoder. Each of the source decoders 110A to 110N may generate different audio formats (e.g., based on the encodings in the different source formats from the source encoders), including metadata synchronized to audio data, in source bitstreams to the target encoder 102. At a given time, the target encoder 102 may receive a bitstream from a particular source decoder, such as source decoder 110A. In some implementations, the system 100 might be configured with only one source decoder, such as the source decoder 110A.

The target encoder 102 may be configured to operate with different types of source decoders (e.g., each of the source decoders 110A to 110N). The target encoder 102 may transcode audio data, utilizing a source decoder that is selected (e.g., the source decoder 110A), to a target format. For example, the target encoder 102 may receive audio data in audio frames from the source decoder 110A (e.g., a decoding of audio data from a corresponding upstream source encoder utilizing the source format), then re-encode the audio data in new audio frames in the target format associated with the target encoder 102. The target encoder 102 may also convert metadata frames from the source decoder that is selected into new metadata frames associated with the target format. For example, the target encoder 102 may transport or carry metadata in the metadata frames, from the source decoder 110A (e.g., corresponding to the upstream source encoder utilizing the source format), in one or more new metadata frames from the target encoder 102. The target encoder 102 may transmit the metadata in the new metadata frames, with the transcoded audio data in the new audio frames, in a target bitstream to the target decoder 104.

The target decoder 104 may be downstream relative to the target encoder 102. The target decoder 104 may enable decoding of audio data from the transcoded audio frames in the target bitstream (e.g., audio data from the new audio frames from the target encoder 102) and transporting the metadata from the target bitstream (e.g., metadata in the new metadata frames from the target encoder 102) with the audio data to a downstream renderer. In some implementations, the target decoder 104 may encapsulate the renderer (e.g., the audio data and/or the metadata need not be sent to a separate renderer, but could be used directly by the target decoder 104 implementing the renderer functionality). The target decoder 104 may be configured based on the target encoder 102. For example, the target decoder 104 may be configured to operate with frames having a size or duration set by the target encoder 102. The target decoder 104 may also be configured based on the type of renderer to which the target decoder 104 will send the audio data and the metadata. For example, renderers 112A to 112N may be present in the system, downstream relative to the target decoder 104, where N is an integer greater than 1. Each of the renderers 112A to 112N may represent a renderer that utilizes a different format for rendering audio data in a 3D sound environment. The renderers 112A to 112N may be implemented by the second device 108, such as the head unit in the vehicle, for playing media content in different ways. For example, at a given time, the target decoder 104 may transmit the audio data and the metadata to a particular renderer, such as renderer 112A. In some implementations, the system 100 might be configured with only one renderer, such as the renderer 112A. The target decoder 104 may decode the audio data and the metadata from the target encoder 102, based on the new frames in the target format, and transmit the audio data and the metadata to the selected renderer (e.g., the renderer 112A). The renderer may then utilize the audio data and the metadata for audio playback. For example, the renderer 112A may utilize the metadata, originating from the source decoder 110A (e.g., and the corresponding source encoder further upstream), to define a position of the audio data, also originating from the source decoder 110A (e.g., and the corresponding source encoder), in a 3D sound environment.

In operation, the target encoder 102 may receive a source bitstream from a source decoder, such as source decoder 110A (e.g., a first type of codec). The source bitstream may include an audio frame in a source format (e.g., size=M samples) associated with the source decoder 110A and a metadata frame associated with the audio frame in the source format. The audio frame may represent a decoding of audio data and the metadata frame may include metadata describing the audio data. The target encoder 102 may transcode the audio frame to a new audio frame in a target format (e.g., size=N samples) associated with the target encoder 102. The target encoder 102 may also convert the metadata frame into a new metadata frame associated with the new audio frame in the target format. The target encoder 102 may then generate a target bitstream including the new audio frame and the new metadata frame. The target decoder 104 may receive the target bitstream including the new audio frame in the target format (e.g., size=N samples) associated with the target encoder 102 and the new metadata frame associated with the new audio frame in the target format. The target decoder 104 may decode the audio data from the new audio frame (e.g., a portion of the audio data from the source decoder 110A) and the metadata from the new metadata frame (e.g., the metadata from the source decoder 110A). The target decoder 104 may then transmit the audio data decoded from the new audio frame and the metadata from the new metadata frame to a selected renderer, such as renderer 112A (e.g., a first type of renderer). The renderer 112A can then utilize the metadata, for example, to play the audio data in the 3D sound environment (e.g., to position a sound corresponding to an object in 3D space, such as the sound of an airplane flying over the listener). In some implementations, the target decoder 104 may implement the renderer functionality.

As a result, the target encoder 102 and/or the target decoder 104 may enable different audio formats that include metadata to be supported in the system 100 while reducing the number of possible codecs in the system 100. For example, while the first device 106 might include several different types of codecs (e.g., source decoders 110A to 110N, generating audio frames based on encodings in different source formats and utilizing metadata differently), the second device 108 need not include each of those different types of codecs, but rather can be limited to a single type of codec (e.g., the target decoder 104). This may reduce the number of codecs in the system.

In some implementations, the target encoder 102 and/or the target decoder 104 can transport or carry the metadata without modifications or changes to the metadata. For example, metadata in the metadata frames generated by codecs, such as source decoder 110A, can be transported by the target encoder 102 in the new metadata frames (e.g., to the target decoder 104, and in turn the renderer) in its entirety and without modification. This may enable the artistic intent associated with the audio data, as represented by the metadata, to remain intact for playback by a selected renderer. This may also enable different metadata arising from different codecs to be carried seamlessly in the system. In some implementations, the target encoder 102 may change the metadata to a different format which may be transmitted to the target decoder 104.

In some implementations, the different codecs (e.g., source decoders 110A to 110N) may define and/or use metadata in different ways. The target encoder 102 can nevertheless transmit the metadata from any of these codecs to the target decoder 104 in the target bitstream.

In some implementations, the target encoder 102 can transmit metadata frames from codecs with sizes and/or durations that are different from sizes and/or durations of frames utilized by the target encoder 102. For example, a frame from source decoder 110A could have a first size (e.g., M samples) or first duration (e.g., 20 ms), and a frame from the target encoder 102 could have a second size (e.g., N samples) or second duration (e.g., 10 ms). The target encoder 102 may transcode the audio data and transport the metadata from the source decoder 110A regardless of differences between size and/or duration.

In some implementations, the target encoder 102 can configure the target bitstream to include additional guidance information to describe metadata frame boundaries. The metadata frame boundaries may enable the target decoder 104 to recover from frame losses or to start decoding from a random point in the target bitstream. For example, the target encoder 102 may include the additional guidance information in the target bitstream to enable the target decoder 104 to determine from the metadata frame boundaries at what audio point and onward the metadata applies. If a frame is lost, the target decoder 104 can start decoding at an arbitrary point in time and determine a boundary at which the metadata applies.

In some implementations, the target encoder 102 and/or the target decoder 104 may enable transmitting metadata frames that are generated in spurts or bursts in addition to metadata frames that are continuously generated. For example, some codecs that are upstream, e.g., the source decoder 110A, might not generate metadata frames continuously, but rather in spurts or bursts (e.g., the metadata could be ad hoc, or sporadic). The target encoder 102 can convert metadata frames to the new metadata frames, whether the metadata is generated continuously or in spurts or bursts, when generating the target bitstream, and the target decoder 104 can decode the target bitstream, including with the new metadata frames in spurts or bursts.

Figure 2:
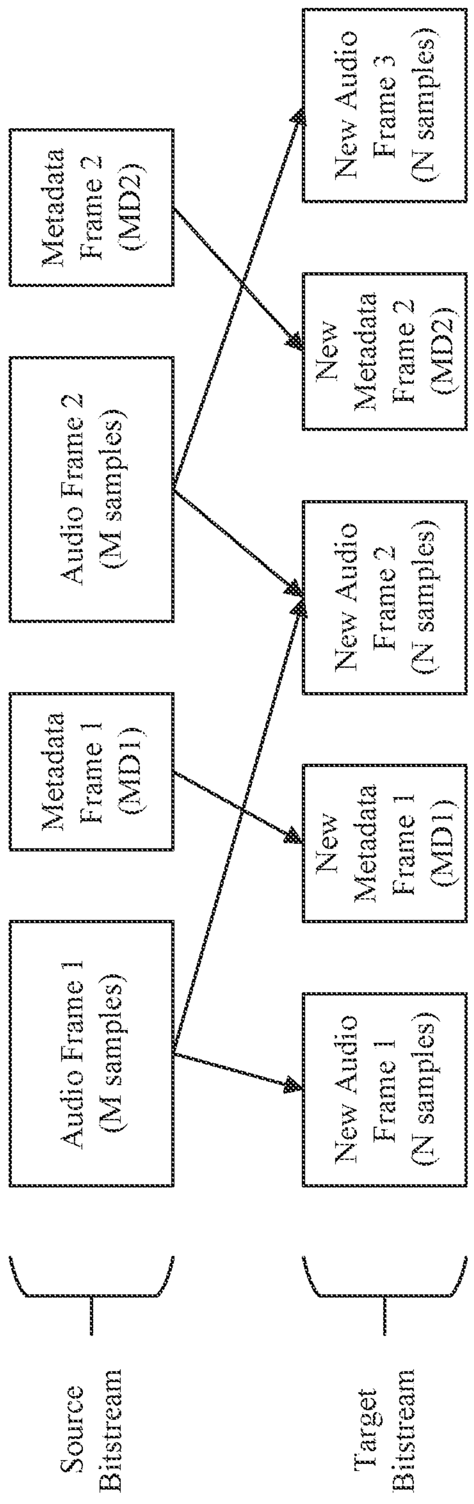
FIG. 2 is an example of generating a target bitstream from a source bitstream.

In some implementations, an audio frame may be mapped to a plurality of new audio frames, and metadata in a metadata frame may be mapped to the plurality of new audio frames, in the target bitstream. Further, in some implementations, a plurality of audio frames may be mapped to a new audio frame, and metadata in a plurality of metadata frames may be mapped to a new audio frame, in the target bitstream. For example, FIG. 2 illustrates a source bitstream from a source decoder (e.g., the source decoder 110A) and a target bitstream from the target encoder 102 generated based on the source bitstream. In the example, the source bitstream, from the source decoder to the target encoder 102, may include a first audio frame in the source format (e.g., "audio frame 1," having M samples), followed by a first metadata frame associated with the first audio frame (e.g., "metadata frame 1," corresponding to the first audio frame, and including metadata "MD1" describing audio frame 1), followed by a second audio frame in the source format (e.g., "audio frame 2," having another M samples), followed by a second metadata frame associated with the second audio frame (e.g., "metadata frame 2," corresponding to the second audio frame, and including metadata "MD2" source bitstream audio frame 2). For example, MD1 could describe a position of audio data for a sound of a first object (e.g., a sound of an airplane encoded by audio frame 1) in a 3D sound environment, and MD2 could describe a position of audio data for a sound of a second object (e.g., a sound of a helicopter encoded by audio frame 2) in the 3D sound environment.

To generate the target bitstream, the target encoder 102 can transcode the audio frames to new audio frames and convert the metadata frames to new metadata frames based on the source format. The target encoder 102 can perform the transcoding and the converting based on differences in frame sizes between the source decoder and the target encoder 102. For example, audio frame 1 (e.g., having a greater size or duration) may be mapped to a first new audio frame in the target format (e.g., new audio frame 1, having N samples, which is lesser in size or duration as compared to audio frame 1 from the source decoder) and to a first portion of a second new audio frame in the target format (e.g., the first 512 bits of new audio frame 2, also having N samples). Further, audio frame 2 (e.g., also having a greater size or duration) may be mapped to a second portion of the second new audio frame (e.g., the second 512 bits of new audio frame 2) and to a third new audio frame in the target format (e.g., new audio frame 3, having N samples). As a result, audio frame 1 and audio frame 2 may each be mapped to a plurality of new audio frames (e.g., audio frame 1 being mapped to new audio frame 1 and a portion of new audio frame 2, and audio frame 2 being mapped to another portion of new audio frame 2 and new audio frame 3).

Additionally, the target encoder 102 can convert metadata frame 1 into a first new metadata frame (e.g., new metadata frame 1, including the metadata MD1, now related to new audio frame 1 and new audio frame 2) and convert metadata frame 2 into a second new metadata frame (e.g., new metadata frame 2, including the metadata MD2, now related to new audio frame 2 and new audio frame 3). For example, MD1 could describe a position of audio data for the first object now encoded by new audio frame 1 and a portion of new audio frame 2, and MD2 could describe a position of audio data for the second object now encoded by a portion of new audio frame 2 and new audio frame 3. The target encoder 102 can transmit the target bitstream, to the target decoder 104, with new audio frame 1, followed by the new metadata frame 1, followed by the new audio frame 2, followed by the new metadata frame 2, and followed by the new audio frame 3. In another example, the target encoder 102 can transcode a plurality of audio frames to a new audio frame and can convert metadata in a plurality of metadata frames to a new audio frame, in the target bitstream. In some implementations, the metadata in a metadata frame can be split into multiple new metadata frames. For example, the splitting could comprise breaking the metadata frame into chunks of equal size, and/or applying a transformation to the metadata before performing the splitting.

FIG. 3 is an example of initializing the target decoder 104 and/or a renderer (e.g., the renderer 112A). For example, the target decoder 104 and/or the renderer 112A could be configured based on the algorithm of FIG. 3, including with (configurable) one-time configuration fields. The target encoder 102 may generate the one-time configuration fields and send the fields to the target decoder 104. The target decoder 104 may then use the fields that it receives to initialize itself. The target decoder 104 may also send one or more fields that it receives to the renderer (e.g., the target decoder 104 may pass fields that are relevant to the renderer). The renderer may then use the one or more fields that it receives to initialize itself.

The algorithm may include, for example, "transcodeConfigPresent" to indicate the path is for transcoding. The algorithm may also include "lengthInBytes" to indicate a length of the rest of the one-time configuration fields in bytes, up to and including "configData" (described below). The algorithm may also include "metadata Version" to indicate a version of configuration data in the one-time configuration fields and/or a version of metadata utilized in the new metadata frames. The algorithm may also include "codecIdentifier" to indicate a type of codec that may be upstream in the system 100 (e.g., whose outputs are to be transcoded, such as the source decoder 110A). For example, a plurality of different source decoders could be used in the system with one of which being identified in this field (e.g., the source decoder 110A). The algorithm may also include "startIdxPresentInframes" to indicate a presence or absence of signaling information that identifies a sample or audio data to which each metadata in a metadata frame corresponds (e.g., metadata frame boundaries). For example, setting to one may indicate that new frames from the target encoder 102 may contain an index of a pulse code modulation (PCM) sample in the audio frame at which the frame-wise metadata starts applying. In another example, clearing to zero may indicate that the foregoing index is absent. The index at which the metadata starts applying may be useful if the metadata frames do not align with new audio frames. For example, the index may be used to guide the renderer (e.g., the renderer 112A) to align the metadata with the samples (e.g., in case of frame losses). The algorithm may also include "configData" to indicate information to select and/or initialize the renderer, among other things. For example, a plurality of different renderers could be used following decoding by the target decoder 104, with a particular one of the renderers indicated by this field. The configData could indicate which renderer of the plurality to use and could further indicate information to initialize the renderer that is selected.

FIG. 4 is an example of a format of metadata in new frames transmitted from the target encoder 102 to the target decoder 104. For example, the algorithm of FIG. 4, including with (configurable) transport fields, could enable the target encoder 102 to perform a frame-by-frame carry of metadata from a source decoder (e.g., source decoder 110A) to the target decoder 104. The algorithm may enable the target encoder 102 to signal the metadata to the target decoder 104 on a frame-by-frame basis. In some implementations, the target encoder 102 may be configured to convert metadata, continuously or in spurts or bursts, utilizing the algorithm and the transport fields.

The algorithm may include, for example, "transcodeConfigPresent" to indicate this path is for transcoding (e.g., from the one-time configuration fields). The algorithm may also include "transcodeMetadataPresent" to enable the target encoder 102 to indicate whether metadata is being carried in a frame in the target bitstream. The algorithm may also include "byteSize" to indicate a size in bytes of renderer frame data. The algorithm may also include "metaDataStartIndex" to enable the target encoder 102 to indicate a point or sample in current audio frame from which the metadata will start applying. The algorithm may also include a "fillBits" field to add dummy bits in a frame, e.g., to generate a multiple of 8 bits. The algorithm may also include a "metaData" field to transport or carry the metadata (e.g., the actual metadata contained in a metadata frame, now carried in a new metadata frame).

The algorithm of FIG. 4 and the transport fields may enable several advantages. For example, if the target encoder 102 is not being used to transcode audio data, then there is no overhead in frames to indicate this is a non-transcode condition. Also, the target encoder 102 can set a flag to indicate whether a frame in the target bitstream contains metadata (e.g., presence of a metadata frame). This may enable carrying metadata frames intermittently, and/or transmitting metadata frames whose sizes/durations are not the same as sizes/durations of the target encoder 102. Further, the target encoder 102 can transmit a start index of a sample or audio data in a current audio frame from which metadata in a metadata frame applies. This could enable, for example, packet loss recovery and/or a random point playback start. Additionally, the target encoder 102 can transmit metadata in the metadata frame in its entirety and without any modifications or changes in new metadata frames to the target decoder 104. As a result, the target encoder 102, based on the transport fields, and the one-time configuration fields, may perform efficient frame-by-frame carrying of metadata with audio data.

FIG. 5 is an example of configuring the target encoder 102 for gapless playback. For example, the target encoder 102 could perform gapless playback based on the algorithm of FIG. 5, including with (configurable) trim fields. The trim fields may enable performance of gapless playback of audio, including following transcoding of audio data and carrying of metadata. Gapless playback may enable removing gaps from one audio track to another for a seamless playback. Gapless playback may be useful, for example, for playback of live performances which may be several hours long (e.g., a concert divided into multiple tracks). Gapless playback may be achieved by the algorithm of FIG. 5 trimming audio samples between tracks (e.g., at the end of a previous track and/or at the beginning of a next track). For example, the algorithm may include "trimmingDataPresent" to indicate this path is for gapless playback (e.g., selection of gapless playback). The algorithm may also include "num SamplesTrimmedFromStart" to indicate a number of samples or audio data to trim from the beginning of a track, and/or "numSamplesTrimmedFromEnd" to indicate a number of samples or audio data to trim at the end of the track.

The algorithm of FIG. 5 and the trim fields may enable trimming to be performed on a per frame basis in combination with carrying metadata. For example, the target encoder 102 could indicate how many samples to trim at the beginning or end of an audio track. The target decoder 104 and/or the renderer (e.g., the renderer 112A) can then use this information to perform the trimming for gapless playback. In some implementations, the renderer could perform the gapless playback by receiving decoded audio frames (e.g., audio data, such as PCM data) from the target decoder 104; utilizing the metadata received from the metadata frames from the target decoder 104 (in some cases, utilizing metadata alignment information) to render objects to a given speaker layout or to headphones; utilizing the trimming data from the audio frames to remove the necessary samples to achieve the gapless effect; and performing the playback of the rendered audio data or PCM to the speakers or headphones.

Figure 6:
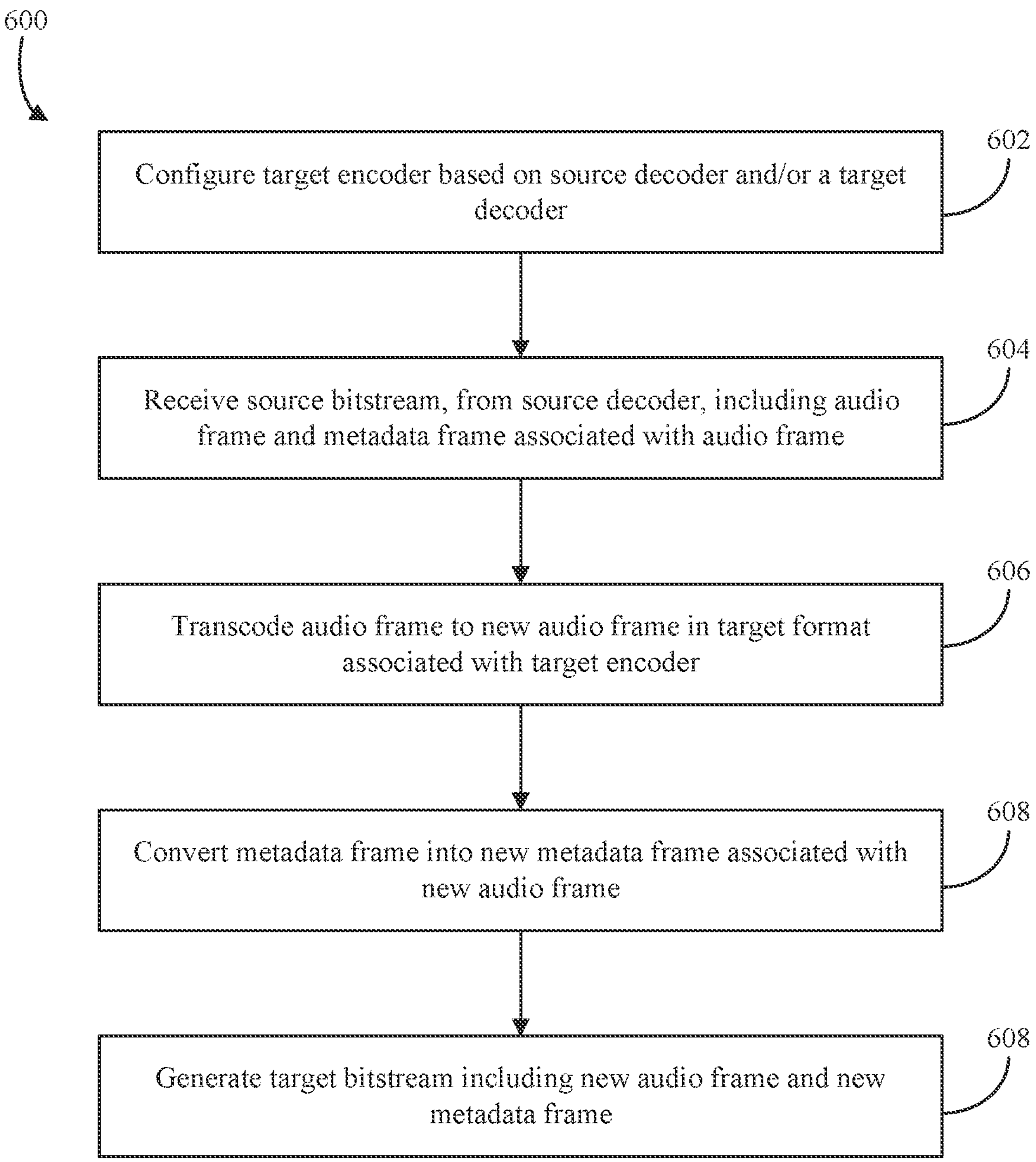
FIG. 6 is a flowchart of an example of a process for transcoding audio frames and converting metadata frames based on a target encoder.

FIG. 6 is a flowchart of an example of a process 600 for transcoding audio frames and converting metadata frames based on a target encoder. The process 600 can be executed using computing devices, such as the systems, hardware, and software described with respect to FIGS. 1-5. The process 600 can be performed, for example, by executing a machine-readable program or other computer-executable instructions, such as routines, instructions, programs, or other code. The operations of the process 600 or another technique, method, process, or algorithm described in connection with the implementations disclosed herein can be implemented directly in hardware, firmware, software executed by hardware, circuitry, or a combination thereof.

For simplicity of explanation, the process 600 is depicted and described herein as a series of operations. However, the operations in accordance with this disclosure can occur in various orders and/or concurrently. Additionally, other operations not presented and described herein may be used. Furthermore, not all illustrated operations may be required to implement a technique in accordance with the disclosed subject matter.

At operation 602, a system may configure a target encoder based on a source decoder and/or a target decoder. For example, the system 100 may configure the target encoder 102 based on a source decoder that is selected from multiple possible source decoder, such as the source decoder 110A, and/or based on the target decoder 104. The target encoder could be implemented by a mobile device (e.g., a mobile phone, laptop, tablet, or other computer).

At operation 604, the system may receive a source bitstream from a source decoder. For example, the target encoder 102, in the system 100, may receive a source bitstream from the source decoder 110A. The source bitstream may include an audio frame and a metadata frame associated with the audio frame. For example, the audio frame may include audio data for a sound of an object in a 3D sound environment (e.g., an airplane flying over the listener). The metadata frame may include metadata associated with the audio data, e.g., describing a position of the audio data for the sound of the object in the 3D sound environment. In other examples, metadata could describe room geometry, ambisonics, channel placements, speaker lists, and/or speaker positions. The audio frame may have a first size or duration, such as M samples, where each sample is composed of X bits.

At operation 606, the system may transcode the audio frame to a new audio frame in a target format associated with a target encoder. For example, the target encoder 102 may receive the audio data in the audio frame and re-encode the audio data in the new audio frame in the target format. In some implementations, the target encoder 102 may map audio data in an audio frame to multiple new audio frames. For example, the target encoder 102 may map a first portion of audio data in an audio frame (e.g., the M samples in size) to a first new audio frame (e.g., N samples, where each sample is composed of Y bits) and a first portion of a second new audio frame and map a second portion of the audio data in the audio frame to a second portion of the new audio frame and to a third audio frame.

At operation 608, the system may convert the metadata frame into a new metadata frame associated with the new audio frame. For example, the target encoder may transport or carry metadata from metadata frames from the source decoder as metadata in new metadata frames from the target encoder in the target format. In some implementations, the target encoder may convert the metadata frame based on the algorithm of FIG. 4 and the transport fields. In some implementations, the target encoder may additionally send trimming data to the target decoder based on the algorithm of FIG. 5 and the trim fields.

At operation 610, the system may generate a target bitstream. The target bitstream may include the new audio frame and the new metadata frame. The target encoder 102, in the system 100, may transmit the target bitstream that is generated to the target decoder 104.

Figure 7:
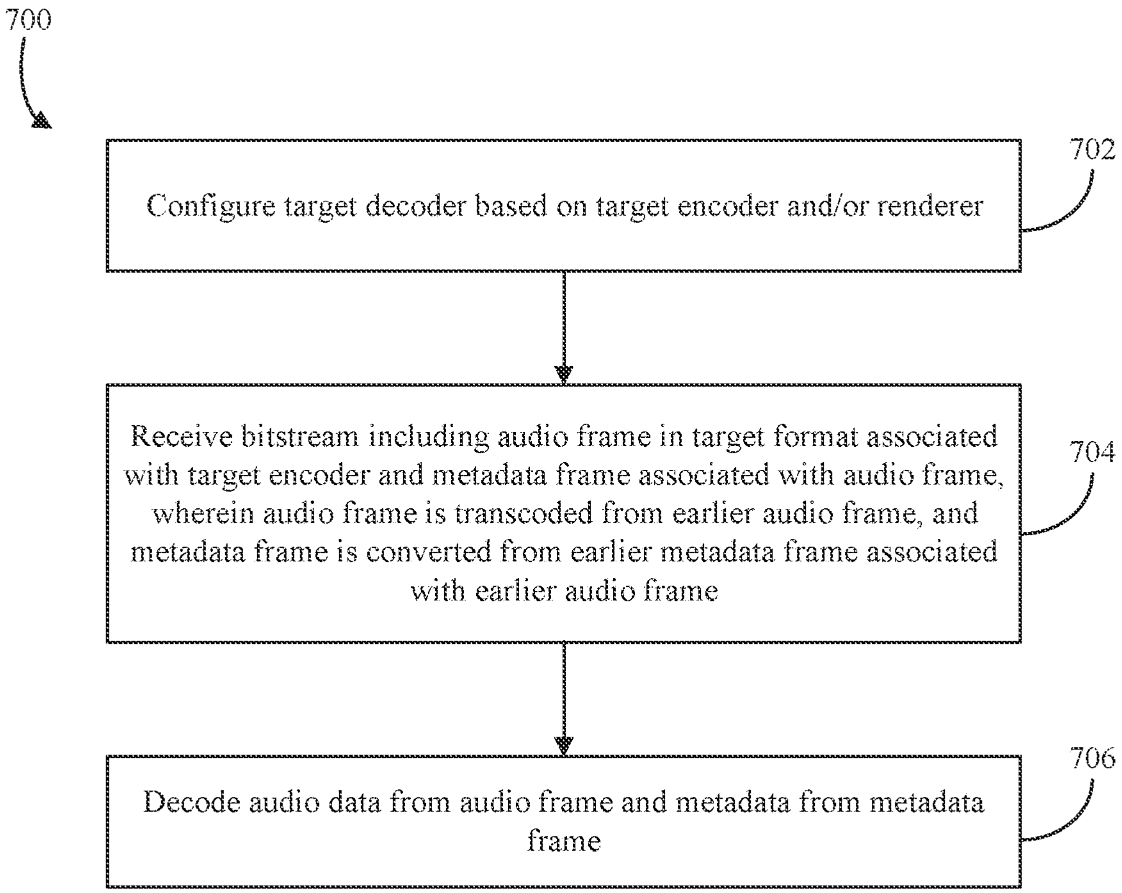
FIG. 7 is a flowchart of an example of a process for decoding audio frames and converted metadata frames from a target encoder.

FIG. 7 is a flowchart of an example of a process 700 for decoding an audio frame and a metadata frame based on transcoding from a target encoder. The process 700 can be executed using computing devices, such as the systems, hardware, and software described with respect to FIGS. 1-5. The process 700 can be performed, for example, by executing a machine-readable program or other computer-executable instructions, such as routines, instructions, programs, or other code. The operations of the process 700 or another technique, method, process, or algorithm described in connection with the implementations disclosed herein can be implemented directly in hardware, firmware, software executed by hardware, circuitry, or a combination thereof.

For simplicity of explanation, the process 700 is depicted and described herein as a series of operations. However, the operations in accordance with this disclosure can occur in various orders and/or concurrently. Additionally, other operations not presented and described herein may be used. Furthermore, not all illustrated operations may be required to implement a technique in accordance with the disclosed subject matter.

At operation 702, a system may configure a target decoder based on a target encoder and/or a renderer. For example, the system 100 may configure the target decoder 104 based on the target encoder 102 and/or a renderer that is selected among multiple possible renderers, such as the renderer 112A. In some implementations, the target decoder and/or the renderer may be initialized based on the algorithm of FIG. 3. In some implementations, the target encoder could be implemented by a mobile device (e.g., a mobile phone, laptop, tablet, or other computer), and the target decoder could be implemented by a head unit of a vehicle.

At operation 704, the system may receive a bitstream including an audio frame in a target format associated with a target encoder (e.g., the new audio frame of the process 700) and a metadata frame associated with the audio frame (e.g., the new metadata frame of the process 700). The audio frame may be transcoded from an earlier audio frame (e.g., the audio frame from the source decoder 110A in the process 700). The metadata frame may be converted from an earlier metadata frame associated with the earlier audio frame (e.g., the metadata frame from the source decoder 110A in the process 700). In some implementations, the target decoder may receive the metadata frame formatted based on the algorithm of FIG. 4. In some implementations, the target decoder may receive trimming information based on the algorithm of FIG. 5.

At operation 706, the system may transmit audio data decoded from the audio frame and metadata from the metadata frame. For example, the target decoder 104 may transmit the audio data decoded from the audio frame and the metadata from the metadata frame to a selected renderer, such as the renderer 112A. In some implementations, the target decoder 104 may implement the renderer. The renderer may then play back the audio data based on the metadata, such as by positioning a sound given by the audio data in a 3D sound environment. In other examples, the metadata may be utilized based on its indication room geometry, ambisonics, channel placements, speaker lists, and/or speaker positions.

Some implementations may include a method, comprising receiving a source bitstream from a source decoder, wherein the source bitstream includes an audio frame and a metadata frame associated with the audio frame; transcoding the audio frame to a new audio frame in a target format associated with a target encoder; converting the metadata frame into a new metadata frame associated with the new audio frame; and generating a target bitstream, wherein the target bitstream includes the new audio frame and the new metadata frame. In some implementations, the method may include transmitting, via the target bitstream, an entirety of metadata from the metadata frame. In some implementations, the method may include transmitting, via the target bitstream, metadata from the metadata frame without modification of the metadata. In some implementations, the audio frame is mapped to a plurality of new audio frames. In some implementations, a plurality of audio frames is mapped to the new audio frame. In some implementations, the metadata frame is mapped to a plurality of new metadata frames. In some implementations, converting the metadata frame into the new metadata frame comprises mapping metadata in the new metadata frame to the new audio frame and to at least a portion of a second new audio frame. In some implementations, the audio frame has a first size or duration, and the new audio frame has a second size or duration that is different than the first size or duration. In some implementations, a size or duration of the audio frame is not equal to a size or duration of the new audio frame. In some implementations, the metadata frame has a first size or duration, and the new metadata frame has a second size or duration that is different than the first size or duration. In some implementations, the metadata frame includes metadata describing audio data in the audio frame, and the new metadata frame includes the metadata describing the audio data in the new audio frame. In some implementations, the metadata frame further includes metadata describing at least one of a room geometry, a channel placement, a speaker list, or a speaker position. In some implementations, the target bitstream includes a start index of metadata to enable a packet loss recovery or a random point playback. In some implementations, a track associated with the new audio frame is trimmed to perform gapless playback. In some implementations, the method may include configuring a target decoder based on a one-time configuration field from the target encoder.

Some implementations may include a non-transitory computer readable medium storing instructions operable to cause one or more processors to perform operations comprising receiving a source bitstream from a source decoder, wherein the source bitstream includes an audio frame and a metadata frame associated with the audio frame; transcoding the audio frame to a new audio frame in a target format associated with a target encoder; converting the metadata frame into a new metadata frame associated with the new audio frame; and generating a target bitstream, wherein the target bitstream includes the new audio frame and the new metadata frame. In some implementations, the operations further comprise transmitting, via the target bitstream, an entirety of metadata from the metadata frame. In some implementations, the operations further comprise transmitting, via the target bitstream, metadata from the metadata frame without modification of the metadata. In some implementations, converting the metadata frame into the new metadata frame comprises mapping metadata in the new metadata frame to the new audio frame and to at least a portion of a second new audio frame. In some implementations, the audio frame has M samples, and the new audio frame has a N samples.

Some implementations may include a method, comprising receiving a bitstream including an audio frame in a target format associated with a target encoder and a metadata frame associated with the audio frame, wherein the audio frame is transcoded from an earlier audio frame, and the metadata frame is converted from an earlier metadata frame associated with the earlier audio frame; and decoding audio data from the audio frame and metadata from the metadata frame. In some implementations, the method may include transmitting an entirety of metadata from the earlier metadata frame. In some implementations, the method may include transmitting metadata from the earlier metadata frame without modification. In some implementations, the method may include determining a renderer from a plurality of renderers. In some implementations, the earlier audio frame has a first size or duration, and the audio frame in the bitstream has a second size or duration. In some implementations, the first size or duration is greater than the second size or duration. In some implementations, the earlier metadata frame includes the metadata describing the audio data, and the bitstream includes the metadata describing the audio data as encoded in the audio frame. In some implementations, the metadata defines a position of the audio data in a 3D sound environment.

Some implementations may include an apparatus, comprising a memory; and a processor configured to execute instructions stored in the memory to receive a bitstream including an audio frame in a target format associated with a target encoder and a metadata frame associated with the audio frame, wherein the audio frame is transcoded from an earlier audio frame, and the metadata frame is converted from an earlier metadata frame associated with the earlier audio frame; and decode audio data from the audio frame and metadata from the metadata frame. In some implementations, the processor is further configured to execute instructions stored in the memory to transmit all metadata from the earlier metadata frame. In some implementations, the processor is further configured to execute instructions stored in the memory to transmit metadata from the earlier metadata frame without changing the metadata. In some implementations, the processor is further configured to execute instructions stored in the memory to determine a renderer from a plurality of renderers. In some implementations, the earlier audio frame has M samples, and the audio frame in the bitstream has N samples. In some implementations, the apparatus is a head unit of a vehicle.

Some implementations may include a non-transitory computer readable medium storing instructions operable to cause one or more processors to perform operations comprising receiving a bitstream including an audio frame in a target format associated with a target encoder and a metadata frame associated with the audio frame, wherein the audio frame is transcoded from an earlier audio frame, and the metadata frame is converted from an earlier metadata frame associated with the earlier audio frame; and decoding audio data from the audio frame and metadata from the metadata frame. In some implementations, the operations further comprising determining a renderer from a plurality of renderers. In some implementations, the earlier audio frame has a first size or duration, and the audio frame has a second size or duration. In some implementations, the first size or duration is greater than the second size or duration. In some implementations, the earlier metadata frame includes the metadata describing the audio data, and the bitstream includes the metadata describing the audio data as encoded in the audio frame. In some implementations, the metadata defines a position of the audio data among a plurality of speakers in a vehicle.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

In utilizing the various aspects of the embodiments, it would become apparent to one skilled in the art that combinations or variations of the above embodiments are possible for forming a fan out system in package including multiple redistribution layers. Although the embodiments have been described in language specific to structural features and/or methodological acts, it is to be understood that the appended claims are not necessarily limited to the specific features or acts described. The specific features and acts disclosed are instead to be understood as embodiments of the claims useful for illustration.

What is claimed is:

1. A method, comprising:

receiving a source bitstream from a source decoder that is a type of codec among multiple types of codecs, wherein the source bitstream includes an audio frame and a metadata frame associated with the audio frame;

transcoding the audio frame to a new audio frame in a target format associated with a target encoder;

converting the metadata frame into a new metadata frame associated with the new audio frame; and generating a target bitstream to be transmitted to a target decoder, wherein the target bitstream includes the new audio frame, the new metadata frame, and configuration fields configured by the target encoder to initialize the target decoder to decode metadata transported in the target bitstream, the configuration fields including a first field indicating a codec identifier to indicate the type of codec used to produce the source bitstream.

2. The method of claim 1, further comprising:

transmitting, via the target bitstream, an entirety of metadata from the metadata frame.

3. The method of claim 1, further comprising:

transmitting, via the target bitstream, metadata from the metadata frame without modification of the metadata.

4. The method of claim 1, wherein the audio frame is mapped to a plurality of new audio frames.

5. The method of claim 1, wherein a plurality of audio frames is mapped to the new audio frame.

6. The method of claim 1, wherein the metadata frame is mapped to a plurality of new metadata frames.

7. The method of claim 1, wherein converting the metadata frame into the new metadata frame comprises:

mapping metadata in the new metadata frame to the new audio frame and to at least a portion of a second new audio frame.

8. The method of claim 1, wherein the audio frame has a first size or duration, and the new audio frame has a second size or duration that is different than the first size or duration.

9. The method of claim 1, wherein a size or duration of the audio frame is not equal to a size or duration of the new audio frame.

10. The method of claim 1, wherein the metadata frame has a first size or duration, and the new metadata frame has a second size or duration that is different than the first size or duration.

11. The method of claim 1, wherein the metadata frame includes metadata describing audio data in the audio frame, and the new metadata frame includes the metadata describing the audio data in the new audio frame.

12. The method of claim 11, wherein the metadata frame further includes metadata describing at least one of a room geometry, a channel placement, a speaker list, or a speaker position.

13. The method of claim 1, wherein the target bitstream includes a start index of metadata to enable a packet loss recovery or a random point playback.

14. The method of claim 1, wherein a track associated with the new audio frame is trimmed to perform gapless playback.

15. The method of claim 1, further comprising:

configuring the target decoder based on the configuration fields.

16. The method of claim 1, wherein the configuration fields include a second field indicating a version of configuration data in the configuration fields or a version of metadata in the new metadata frame.

17. The method of claim 1, wherein the target encoder indicates in the target bitstream whether metadata is carried in a frame in the target bitstream.

18. A non-transitory computer readable medium storing instructions operable to cause one or more processors to perform operations comprising:

receiving a source bitstream from a source decoder that is a type of codec among multiple types of codecs, wherein the source bitstream includes an audio frame and a metadata frame associated with the audio frame;

transcoding the audio frame to a new audio frame in a target format associated with a target encoder;

converting the metadata frame into a new metadata frame associated with the new audio frame; and generating a target bitstream to be transmitted to a target decoder, wherein the target bitstream includes the new audio frame, the new metadata frame, and configuration fields configured by the target encoder to initialize the target decoder to decode metadata transported in the target bitstream, the configuration fields including a first field indicating a codec identifier to indicate the type of codec used to produce the source bitstream.

19. The non-transitory computer readable medium storing instructions of claim 18, the operations further comprising:

transmitting, via the target bitstream, an entirety of metadata from the metadata frame.

20. The non-transitory computer readable medium storing instructions of claim 18, the operations further comprising:

transmitting, via the target bitstream, metadata from the metadata frame without modification of the metadata.

21. The non-transitory computer readable medium storing instructions of claim 18, wherein converting the metadata frame into the new metadata frame comprises:

mapping metadata in the new metadata frame to the new audio frame and to at least a portion of a second new audio frame.

22. The non-transitory computer readable medium storing instructions of claim 18, wherein the audio frame has M samples, and the new audio frame has a N samples.

* * * * *